June 10, 1930.  H. F. SCHMIDT  1,762,360
THRUST BEARING
Filed Sept. 10, 1927

WITNESS
E. Lutz

INVENTOR
H.F.Schmidt
BY
a.B.Reavis
ATTORNEY

Patented June 10, 1930

1,762,360

UNITED STATES PATENT OFFICE

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA

THRUST BEARING

Application filed September 10, 1927. Serial No. 218,819.

My invention relates to thrust bearings of the Kingsbury type, and it has for an object to improve the construction of bearings of this class.

In bearings of the type described, the lubricant, such as oil, forms wedge-shaped oil films which carry the load. Under different conditions of operation it is desirable that films of different thickness be maintained. These films will automatically assume the proper proportions for the various pressures if the bearing structure possesses the requisite yieldability.

It is also desirable that the bearing structure should embody means for equalizing the load received from the pressure transmitting surface, so that all of the bearing surface may be fully effective and thus to preclude the possibility of having one shoe, for example, assume all, or a greater portion of the load.

Heretofore some bearings have been provided with yieldable supports to allow the thickness of the oil films to change in response to pressure as explained in my former Patent No. 1,414,711, dated May 2, 1922, while other bearings have been provided with means for equalizing the load received. In the latter case, the bearing structure has only possessed yieldability to the extent allowed by the equalizing means, while in the former, no equalizing means have been provided.

More particularly, therefore, it is an object of my invention to provide a bearing of the type described in which means are provided for yieldably supporting the bearings, and in which means are also provided for equalizing the load, or pressures, transmitted, and to provide a simple, efficient, and inexpensive structure for accomplishing these purposes.

Apparatus embodying features of my invention is illustrated in the accompanying drawings in which.

According to my invention, bearing pads are spaced around a resilient ring in eccentric relation with respect to abutments, or pivotal supporting means on the ring, so that as the ring yields in response to pressure, the flexing of the ring will deflect the bearings in the proper manner to produce the well-known wedge-shaped oil film. The pivotal connections of the resilient ring rest against the arms of equalizing levers so that it is assured that the pressure will be equally distributed around the ring and that equal deflection may occur at all the bearing pads. Also the resiliency of the ring assures that the oil films will be well defined at all times and will assume the proper proportions in response to variations in pressure.

Figure 1:
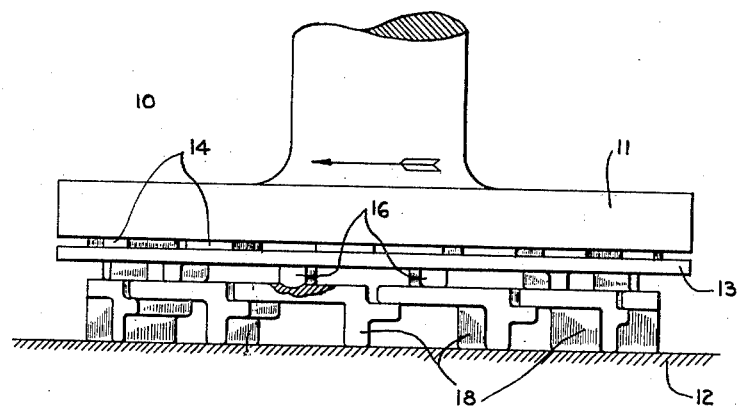
Fig. 1 is an elevation of a thrust bearing.
Figure 2:
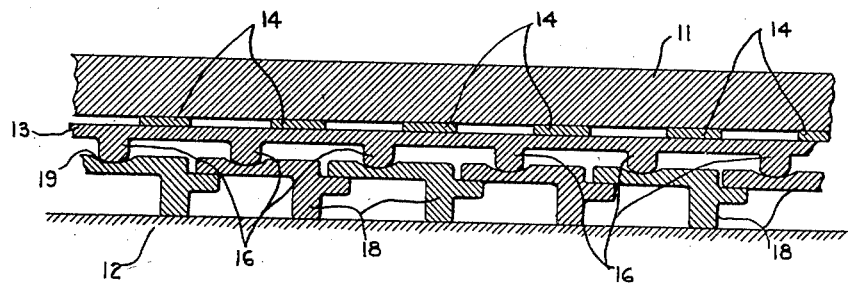
Fig. 2 is a developed section of the bearing shown in Fig. 1.

Referring now to the drawings for a better understanding of my invention, I show a thrust bearing indicated generally at 10, and comprising a relatively movable member, such as a thrust collar 11, and a relatively stationary member, such as the housing 12 for the bearing. Disposed adjacent to the thrust collar 11 is a flexible ring 13, which may be made of any suitable material, such as spring steel. Substantially equally spaced about the face of the ring adjacent the thrust collar 11 are any suitable number of pads of babbitt, or other bearing metal 14. The normal direction of rotation of the collar is indicated by the arrow in Fig. 1.

Disposed between the adjacent entrant and exit edges of the respective bearings 14, and on the opposite face of the ring 13, are suitable abutments 16, which serve to pivotally support the ring 13; and, inasmuch as the bearing pads 14 are disposed eccentrically with respect to the supporting fulcrums or pivots 16, it will be obvious that, as the ring 13 yields in response to pressure, the deflection of the forward, or entrant, side of the bearings 14 will be greater than that at the exit side, and will thus provide for the formation of the wedge-shaped oil films between the collar 11 and the bearings 14.

In order that the total pressure or thrust transmitted may be equally distributed between the various bearings, I provide a series of equalizing or leveling members 18. These members 18 are in the form of levers having unequal arms, and are fulcrumed on the relatively stationary member 12. The members 18 are arranged in the form of a continuous chain around the bearing, the longer arm of each of these members engaging the shorter arm of another, and the respective longer arms may also be slightly recessed as indicated at 19, to pivotally receive the respective abutments 16, and to assure that the equalizing members will remain in the proper relation with respect to the ring.

From the above description, it will be seen that an abnormal pressure on any one of the bearing pads will result in a correspondingly increased pressure on its adjacent supporting abutment 16 which action will cause the longer arm of its supporting lever to move toward the stationary housing 12. This movement of the longer arm will result in a movement in the opposite direction of the shorter arm of this lever and also a movement in the same direction of the longer arm of the adjacent lever 18 which latter is engaged by the shorter arm of the first-named lever 18. As this longer arm of the second lever 18 supports an abutment 16, the upward movement of the longer arm will cause the abutment to move upwardly and increase to a slight degree, the pressure on the bearing pads which it supports. As all of the levers 18 are connected in a continuous chain, an abnormal movement of one lever will cause the other levers to also move, and as a result, the pressure on the bearing pads will be equalized.

It will readily be seen that the flexible ring 13 provides a supporting structure which is yieldable locally to allow for variations in thickness of the oil film, and that the equalizing members 18 assure that the pressure will be equally distributed about the bearings so that all the bearing pads will be fully efficient. By means of this type of construction, a well defined oil film under all conditions of operation is assured.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are set forth in the appended claims.

What I claim is:—

1. In a thrust bearing, the combination of a thrust collar, supporting means, a plurality of bearing pads cooperating with said collar, a flexible ring for supporting said pads, a closed chain of articulated equalizer members carried by said supporting means, and fulcrum connections between the equalizer members and the flexible ring.

2. In a thrust bearing, the combination of a thrust collar, supporting means, a plurality of spaced pads cooperating with said collar, a flexible ring having said pads supported at one side thereof, a closed series of articulated equalizer members carried by said supporting means, and fulcrum connections between said flexible ring and said equalizing members.

3. In a thrust bearing, the combination of a thrust collar, supporting means, an annular series of spaced bearing pads cooperating with said collar, flexible means for supporting said pads, an annular series of articulated equalizer members carried by said supporting means, and fulcrum connections between the respective equalizing members and said flexible means, each of said pads being arranged between a pair of fulcrum connections and nearer to one of the connections of said pair than to the other and all of said pads and fulcrum connections being similarly arranged successively circumferentially.

4. In a bearing, the combination of relatively movable and stationary members, a series of bearing pads cooperating with one of said members for supporting the load, a flexible ring member supporting at one face thereof the bearing pads, a series of equalizing members disposed adjacent another face of the ring member, and pivotal connections between the equalizing members and the ring member at points adjacent the trailing edges of said bearing pads.

5. In a bearing, the combination of relatively movable and relatively stationary members, a series of bearing pads cooperating with one of said members for supporting the load, a flexible ring member supporting on one face thereof the bearing pads, a series of equalizing members disposed adjacent the ring member, and pivotal connections between the equalizing members and the ring member and in staggered relation with respect to the bearing pads.

6. In a bearing, the combination of relatively movable and stationary members, a series of bearing pads cooperating with one of said members for supporting the load, a flexible ring supporting on one face thereof the bearing pads, a series of equalizing members disposed adjacent the ring, each of said equalizing members being provided with pivotal supports and with unequal arms, and means providing pivotal connections between the ring member and each of the longer of said unequal parts.

In testimony whereof, I have hereunto subscribed my name this 2nd day of September, 1927.

HENRY F. SCHMIDT.